UNITED STATES PATENT OFFICE.

JOSEPH KOKESCH, OF PARIS, FRANCE.

IMPROVEMENT IN TREATMENT OF SEAL-SKINS.

Specification forming part of Letters Patent No. 195,826, dated October 2, 1877; application filed June 18, 1877.

*To all whom it may concern:*

Be it known that I, JOSEPH KOKESCH, of Paris, France, have invented Improvements in the Treatment of Seal-Skins, and for which Letters Patent were granted to me in the Republic of France for fifteen years from the 11th day of May, 1877; in the Kingdom of Belgium for twenty years from the 9th day of May, 1877; and in the Kingdom of Great Britain for a term of fourteen years from the 29th day of May, 1877.

My invention relates to improvements introduced into the treatment of seal-skins for the purpose of giving to their fur the appearance of the more valuable furs of the otter and beaver.

To this end I submit the raw or finished seal-skin to the action of a shearing-machine, by means of which the hair is reduced to the length of that of the otter or beaver to be imitated, the skin being previously or subsequently passed through a fulling-mill to reverse the direction of the fur.

To the skin thus shorn I apply a mordant composed of quicklime, one pound; beech-ashes, one and a half pound; sumach, three ounces; water, twenty quarts. Of this mordant I employ about one gallon for every eight skins, immersing the latter in said mordant for about five hours, after which it is dyed in a bath composed of gall-nuts, one and a half pound; green copperas, three ounces; copper scales, two ounces; litharge, one and a half ounce; sal-ammoniac, one and a half ounce; verdigris, one-half ounce; catechu, two ounces; rotten-stone, two ounces; cinnabar, one ounce; water, thirty quarts; the above ingredients to be boiled together for, say, one hour and a half, or until the volume of the mass is reduced to about twenty quarts.

Of the dye I employ about three gallons for every eight skins, allowing them to be drawn, or passed through, or dipped into the dye about four times, brushing each skin after every immersion. When so treated the skins should be allowed to remain in a wet state for about twelve hours and then dried.

It will, however, be obvious that the ingredients composing both the mordant and the dye may be varied slightly as to their respective quantities; so will the time of steeping the skins in the mordant and the number of immersions in the dye vary according to circumstances and the nature of the skins to be treated, which will, in a great measure, depend on the thickness of the fur and that of the hide.

What I claim is—

1. In the treatment of seal-skins, preparing such skins by first subjecting them to a process of shearing to reduce the length of the hair, as set forth; secondly, to a process of fulling to reverse the hair; and, finally, mordanting said skins, substantially as described, for the purpose specified.

2. In the treatment of seal-skins, preparing such skins by first subjecting them to a process of shearing; secondly, to a process of fulling; thirdly, mordanting said skins; and, finally, immersing them a number of times in succession into a dye, brushing each skin after every such immersion, in the manner and for the purposes specified.

3. In the treatment of seal-skins, a mordant consisting of quicklime, beech-ashes, sumach, and water, in or about in the quantities specified, for the purpose as set forth.

4. In the treatment of seal-skins, a dye consisting of gall-nuts, green copperas, copper scales, litharge, sal-ammoniac, verdigris, catechu, rotten-stone, cinnabar, and water, in or about in the proportions as hereinbefore described, for the purpose specified.

J. KOKESCH.

Witnesses:
 F. MENNONS, Jr.,
 J. FONTENELLE,
*Clerks to Mess. Mennons & Co., Patent Solicitors, Paris.*